US009495955B1

(12) United States Patent
Weber et al.

(10) Patent No.: US 9,495,955 B1
(45) Date of Patent: Nov. 15, 2016

(54) ACOUSTIC MODEL TRAINING (71) Applicant: Amazon Technologies, Inc., Reno, NV (US)

(72) Inventors: Frederick Victor Weber, New York, NY (US); Jeffrey Penrod Adams, Tyngsborough, MA (US)

(73) Assignee: Amazon Technologies, Inc., Seattle, WA (US)

( * ) Notice: Subject to any disclaimer, the term of this patent is extended or adjusted under 35 U.S.C. 154(b) by 552 days.

(21) Appl. No.: 13/733,084

(22) Filed: Jan. 2, 2013

(51) Int. Cl.
*G10L 15/00* (2013.01)
*G10L 15/06* (2013.01)

(52) U.S. Cl.
CPC .................................. *G10L 15/063* (2013.01)

(58) Field of Classification Search
CPC ..... G10L 15/00; G10L 15/06; G10L 15/063; G10L 15/065; G10L 15/07; G10L 15/075; G10L 17/00; G10L 17/04; G10L 2015/00; G10L 2015/063; G10L 2015/0631; G10L 2015/0635; G10L 2015/0636; G10L 2015/0638
USPC ....... 704/231, 236, 239, 246, 251, 243, 244; 93/231, 236, 239, 246, 251, 243, 244
See application file for complete search history.

(56) References Cited

U.S. PATENT DOCUMENTS

| 5,832,441 | A * | 11/1998 | Aaron et al. | 704/276 |
|---|---|---|---|---|
| 6,941,264 | B2 * | 9/2005 | Konopka et al. | 704/243 |
| 7,263,487 | B2 * | 8/2007 | Hwang | 704/243 |
| 8,160,876 | B2 * | 4/2012 | Dow | G10L 15/26 704/244 |
| 8,185,392 | B1 * | 5/2012 | Strope et al. | 704/252 |
| 8,290,773 | B2 * | 10/2012 | Washio | 704/243 |
| 8,374,866 | B2 * | 2/2013 | Weinstein et al. | 704/243 |
| 8,412,521 | B2 * | 4/2013 | Mathias et al. | 704/235 |
| 8,583,432 | B1 * | 11/2013 | Biadsy et al. | 704/235 |
| 8,706,827 | B1 * | 4/2014 | Noble et al. | 709/206 |
| 8,756,062 | B2 * | 6/2014 | Talwar et al. | 704/256.2 |
| 8,831,957 | B2 * | 9/2014 | Taubman et al. | 704/275 |
| 2003/0120488 | A1 * | 6/2003 | Yoshizawa et al. | 704/233 |
| 2003/0200094 | A1 * | 10/2003 | Gupta et al. | 704/270.1 |
| 2004/0138882 | A1 * | 7/2004 | Miyazawa | 704/233 |
| 2005/0131694 | A1 * | 6/2005 | Nishitani et al. | 704/256 |
| 2008/0147404 | A1 * | 6/2008 | Liu et al. | 704/256.2 |
| 2009/0271201 | A1 * | 10/2009 | Yoshizawa | 704/255 |
| 2011/0295590 | A1 * | 12/2011 | Lloyd et al. | 704/8 |
| 2012/0059652 | A1 * | 3/2012 | Adams et al. | 704/235 |
| 2012/0109649 | A1 * | 5/2012 | Talwar et al. | 704/236 |
| 2012/0253799 | A1 * | 10/2012 | Bangalore et al. | 704/231 |
| 2013/0253930 | A1 * | 9/2013 | Seltzer et al. | 704/236 |
| 2013/0262106 | A1 * | 10/2013 | Hurvitz et al. | 704/235 |
| 2014/0025379 | A1 * | 1/2014 | Ganapathiraju | G10L 15/08 704/255 |
| 2014/0088964 | A1 * | 3/2014 | Bellegarda | 704/243 |
| 2014/0163977 | A1 * | 6/2014 | Hoffmeister et al. | 704/232 |
| 2015/0149167 | A1 * | 5/2015 | Beaufays et al. | 704/236 |

* cited by examiner

*Primary Examiner* — Paras D Shah
(74) *Attorney, Agent, or Firm* — Knobbe, Martens, Olson & Bear, LLP (57) ABSTRACT

Features are disclosed for generating acoustic models from an existing corpus of data. Methods for generating the acoustic models can include receiving at least one characteristic of a desired acoustic model, selecting training utterances corresponding to the characteristic from a corpus comprising audio data and corresponding transcription data, and generating an acoustic model based on the selected training utterances.

26 Claims, 6 Drawing Sheets

FIG. 2

EXCERPT FROM TRANSCRIPT OF AUDIO BOOK 300

John was nervous to attend his new school. Having moved in to his new neighborhood at the end of the summer, he had not yet been able to make new friends. As he walked out on the playground before school, a girl about his age said, "Come over here. What is your name?" — C1, Q1

"John."

"Nice to meet you, John. My name is Alice and this is Sally."

"Did you recently move here?" — Q2

"Yes. From Boston.

"Well, welcome to McKinley Elementary. Do you want to play handball with us?" — Q3

"Sure – thanks!"

ACOUSTIC MODEL TRAINING

BACKGROUND

Current speech recognition systems typically include an acoustic model and a language model. The acoustic model is used to generate hypotheses regarding which sound subword units (such as phonemes) correspond to speech based on the acoustic features of the speech. The language model is used to determine which of the hypotheses generated using the acoustic model is the most likely transcription of the speech based on lexical features of the language in which the speech is spoken. The acoustic model and language model are typically generated and adapted using training data, including transcriptions known to be correct.

The acoustic models are typically created by comparing audio recordings of speech with their corresponding textual transcriptions and then generating statistical representations of the possible sounds of subword units in a language based on the comparison. Acoustic models are generally more accurate and effective in recognizing sounds when they are generated based on a very large number of samples obtained through an acoustic model training process. In one approach, acoustic model training requires a human speaker to speak a specific sequence of known text. In another approach, the speaker's speech may be captured, transcribed, and then corrected manually by the speaker. One drawback of acoustic model training, among others, is that it can be difficult, time-consuming, and expensive to acquire training data (e.g., human speech) and transcriptions known to be correct. For example, a human may be required both to speak the speech and perform the transcription.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Introduction

The present disclosure generally relates to systems and methods for generating or training acoustic models. The process of generating or training acoustic models may be based on training information or data. As discussed above, speech recognition may be based on an acoustic model that models the pronunciation of subword units (such as phonemes). The accuracy of the speech recognition may be improved if a large amount of training data is available to configure the acoustic model. The quality of the acoustic model may be improved by including in the training data several examples of each subword unit from several different recordings. However, obtaining the training data to build the acoustic model may involve considerable time and expense in recruiting and compensating people to record spoken utterances and transcribe the spoken utterances into corresponding text known to be correct.

Accordingly, aspects of the present disclosure pertain to obtaining training data from a pre-existing corpus of audio data and corresponding transcription data (such as audiobooks or movie soundtrack/script combinations). Acoustic models are generally improved by adding more and more training data; however, in some implementations, acoustic models may be improved if they are adapted to particular acoustic applications based on desired training information, such as characteristics of utterances expected to be uttered by speakers using a particular speech recognition system.

An "utterance" as used herein, in addition to its ordinary meaning, can include a sentence or phrase or a portion of a sentence or phrase such as one or more words or one or more subword units (e.g., phones, triphones). The utterance may include audio data and a transcription of the audio data. The transcription can be generated by a human actor or generated by one or more computing devices implementing automatic speech recognition. The term "training," as used herein, in addition to its ordinary meaning, can also mean one or more of generating, creating, configuring, updating or adapting acoustic models.

Utterance characteristics may include characteristics of the utterances themselves, such as types of utterances (e.g., queries, commands, etc.), pitch or intonation characteristics, inflection characteristics, noise environment characteristics, emotion characteristics, and/or other prosody characteristics. Utterance characteristics may also include speaker characteristics, such as accent, gender, age, and lisp characteristics. In some implementations, utterance characteristics may include domain characteristics indicative of a particular application (such as medical transcription, customer service calls, etc.). In some implementations, the training information includes a script of actual utterances or portions of utterances desired to be included in training acoustic models. The actual utterances or portions of utterances may include sentences, phrases, words, subword units, triphones, phones, etc. The portions of utterances may be based on particular desired phonetic contexts to be trained.

An acoustic model may generally be thought of as a mapping of acoustic features to subword units Specifically, a frame of speech may be described in terms of its acoustic features. These features may include, for example, the energy of the frame over a particular set of frequency bands; comparisons of the energies of these frequency bands to an immediately prior frame (sometimes referred to as "deltas"); and other comparisons, including higher level deltas such as second, third, and higher-order derivatives. The features of a frame may be represented as an n-dimensional vector, sometimes referred to as a feature vector. Frames and their corresponding feature vectors may be mapped to a subword unit such as a phoneme. In some implementations, a subword unit may be represented by a hidden Markov model, and each state of the hidden Markov model may be represented by a mixture of Gaussian distributions, sometimes referred to as a Gaussian mixture model. A Gaussian mixture model may include a linear combination of Gaussian (or normal) distributions, each having a weight, a mean, and a variance. The accuracy of speech recognition may advantageously be improved by training or updating an acoustic model based on one or more characteristics.

In accordance with several implementations, characteristics of the data within an existing corpus of utterances are identified and tags or labels indicative of the characteristics are applied to the portions of the data in the corpus exhibiting the characteristics. The characteristics of the data within the corpus may be identified in advance during a pre-processing routine or may be identified "on the fly" substantially in real time during an acoustic model training process. In some implementations, the corpus data may include metadata. In some cases, the metadata may be used to facilitate the identification process or it may be generated by the identification process. For example, an audiobook may include metadata that provides the speaker's identity, age, gender, and/or accent. A movie soundtrack may include metadata that identifies a cast list, which speaker in the cast speaks each line in the movie transcript, and speaker characteristics, as described above. Other metadata can identify a date and/or time of an utterance, a location (e.g., where the utterance was spoken), emotional characteristics, or background noise characteristics of portions of the corpus data, etc.

Specialized or targeted acoustic models may then be generated or updated from the data based on one or more desired characteristics. For example, acoustic models may be generated from utterances of the corpus identified (previously or on the fly) as being questions or queries. Acoustic models may be generated from utterances of the corpus identified as being spoken by speakers with a particular accent (such as British English) or speakers of a particular gender and/or in a particular age category. The specialized or targeted acoustic models may be created, for example, for particular types of speakers or particular types of applications.

Creating specialized acoustic models based on desired training information (such as the characteristics described above) may advantageously improve accuracy of the acoustic models. The corpus of utterances may advantageously be used to generate multiple specialized acoustic models based on different training characteristics without requiring recording and transcription of new training data. Use of an existing corpus of pre-processed data may also advantageously facilitate updating existing acoustic models or building new models quickly when new commands, device names, or other parameters are established.

The characteristics of the corpus may be determined by human input; by text searching of the corpus for particular phrases, words, punctuation, etc.; by using natural language processing (such as identification of keywords indicative of an utterance type); and/or by using acoustic signal processing methods on audio data (such as pitch detection) in the corpus. Tags or other indicia indicative of one or more characteristics may be applied to the content of the corpus data on a source level, a subsection level (such as a chapter, page, paragraph or other subsection), a word level, and/or a subword unit level.

In some implementations, speech recognition results for an existing acoustic model may be generated and evaluated. Speech recognition results having low confidence values may be identified and the acoustic model may be updated or reconfigured by finding examples of utterances within the corpus having characteristics in common with the utterances resulting in the low confidence values. For example, speech recognition may provide poor results (have low confidence values) for men with deep voices or for words with relatively rare triphones. In such instances, examples of utterances or portions of utterances within the corpus from male speakers with deep voices or of words with the relatively rare triphones may be identified and used to update or adapt an acoustic model. This process of identifying weak areas in an acoustic model and updating or adapting the model may advantageously improve the accuracy of acoustic models.

Overview

Figure 1:
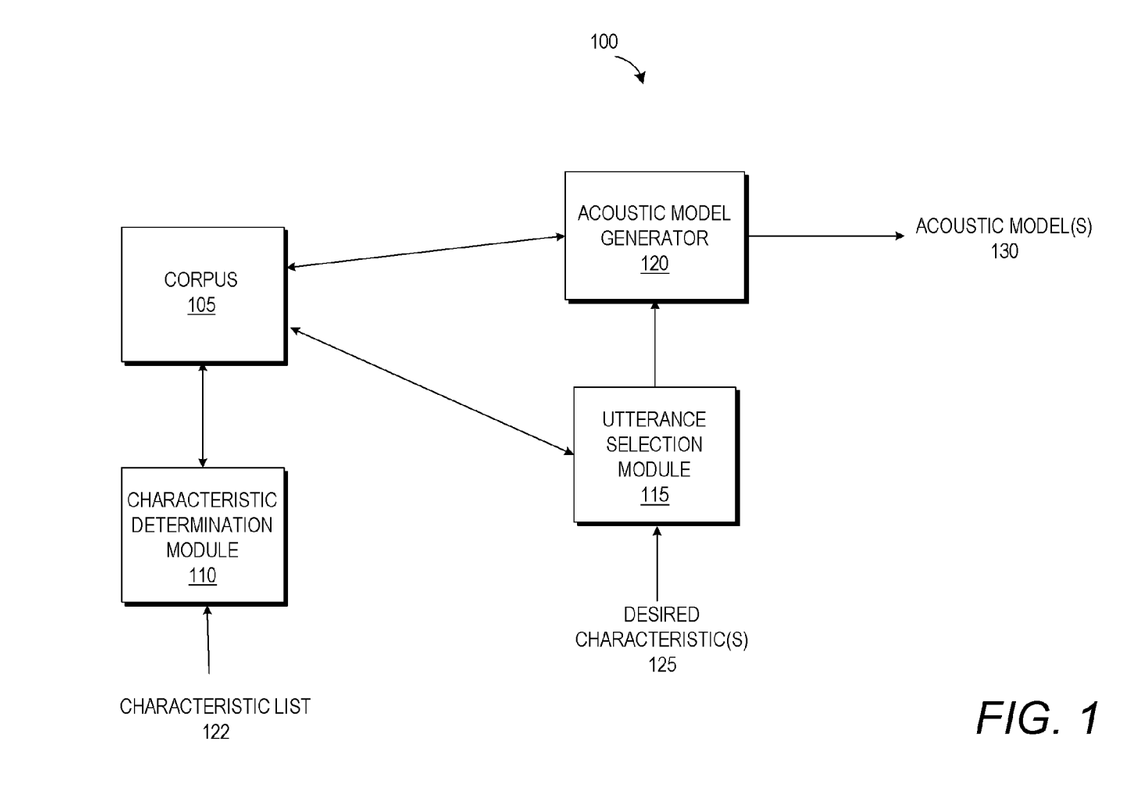
FIG. 1 is a schematic diagram of an embodiment of an acoustic model training system configured to generate acoustic models based on one or more characteristics.

FIG. 1 depicts a schematic block diagram of an embodiment of acoustic model generation using an existing corpus of data. The acoustic modeling environment 100 may include a pre-existing corpus 105 of audio data and corresponding transcription data. The corpus 105 may include audio and corresponding transcription data from audiobooks, movie soundtracks, customer service calls, speeches, podcasts, webchats, interviews, medial transcriptions, blogs, logs, or other sources. The transcription data may be known transcription data that has been previously matched or aligned with the audio data. Although the corpus 105 has been illustrated as a unified body of data on a single data store, the corpus 105 may be stored on multiple data stores of one or more computing devices (e.g., servers). In some implementations the corpus 105 is stored on multiple computing devices of a distributed computing environment.

As shown, the acoustic modeling environment 100 may include a characteristic determination module 110, an utterance selection module 115, and an acoustic model generator 120 in communication with the corpus 105. The characteristic determination module 110 may be configured to receive a list of characteristics 122 and then to identify data in the corpus 105 having the received characteristics 122. In some implementations, the characteristic determination module 110 applies a tag or label to data in the corpus 105 indicative of one or more of the characteristics 122. An illustrative process for identifying data in the corpus 105 having one or more of the characteristics and tagging the identified data will be described in more detail below in connection with FIG. 2.

The characteristics 122 may include characteristics of utterances, such as types of utterances (e.g., queries or commands), pitch or intonation characteristics, inflection characteristics, noise environment characteristics, emotion characteristics, other prosody characteristics (such as slurred speech due to speech impairment from alcohol or drugs), language characteristics, word characteristics, and/or subword unit characteristics (such as triphone or phoneme characteristics). The word or subword unit characteristics may include phonetic context characteristics. The characteristics 122 may also include speaker characteristics, such as accent, gender, age, and lisp characteristics. In some implementations, the characteristics 122 may include domain characteristics. Domain characteristics may be indicative of a particular application (such as voicemail, medical transcription, customer service calls, reminders, to-do lists, text messaging, etc.).

The utterance selection module 115 may be configured to receive one or more desired characteristics 125 to be used in creating a specialized acoustic model and to select utterances or portions of utterances in the corpus 105 having the one or more desired utterance characteristics 125. In implementations where the characteristic determination module 110 has pre-processed the corpus 105 and applied tags to the utterances indicative of utterance characteristics in advance, the utterance selection module 115 selects the utterances tagged as having the desired characteristics 125. In other implementations, the utterance selection module 115 identifies the data within the corpus 105 having the desired characteristics 125 "on the fly," or substantially in real time.

The desired characteristics 125 may be any of the types of characteristics described above with respect to the list of characteristics 122. In some implementations, the desired characteristics 125 may comprise a script of actual utterances or portions of utterances pertaining to an acoustic context or application for training. In such implementations, the utterance selection module 115 may have to identify data from the corpus having the desired characteristics 125 on the fly substantially in real time.

In some implementations, a list or other identification of utterances from the corpus 105 having the desired characteristics 125 is transmitted to the acoustic model generator 120 for use in generating one or more acoustic models 130 based on the one or more desired characteristics 125. The list of utterances from the corpus 105 transmitted to the acoustic model generator 120 may include pointers to the locations of the utterances within the corpus 105. In other implementations, copies of the data from the corpus 105 indicative of the desired characteristics 125 are extracted and stored in a local memory or data store (not shown) by the utterance selection module 115 for subsequent access by the acoustic model generator 120. The acoustic model generator 120 may be in communication with the local memory or data store via a network (wired or wireless) or a direct communication link.

The acoustic model generator 120 may be configured to generate one or more acoustic models 130 or adapt an existing acoustic model based on the utterances from the corpus 105 identified as having the one or more desired characteristics 125. The process of generating and or adapting acoustic models may be referred to herein as training. Adapting an existing acoustic model may include, for example, adapting a general acoustic model to a more specific acoustic model based on a desired training application or area of weakness or adapting an existing acoustic model from one domain to another domain (such as from a dictation acoustic model to an acoustic model for reminders for smartphones).

The acoustic model generator 120 may also optionally include a feedback module configured to generate speech recognition results from an existing acoustic model and identify one or more areas in which the acoustic model may need improvement. For example, the speech recognition results may indicate that utterances having particular characteristics have low confidence scores. The acoustic model generator 120 may be configured to update or adapt the acoustic model or build a new model using utterances or portions of utterances identified from the corpus 105 having characteristics corresponding to the identified areas for improvement. Accordingly, the acoustic model generator 120 may be in communication with a feedback module (which may be a component of the utterance selection module 115) to identify utterances or portions of utterances from the corpus 105 having characteristics corresponding to the identified areas for improvement.

Areas of improvement may include, for example, certain kinds of speech (such as relatively rare triphones or commonly confused triphones, subword units, words or phrases), speech from particular speakers (such as male speakers with deep voices or speakers with particular accents, speakers with lisps or speakers with slurred speech due to impairment from alcohol or drugs), utterances spoken in particular noise environments (such as a moving vehicle or an outside environment with substantial background noise), or other acoustic contexts.

Characteristic Determination

Figure 2:
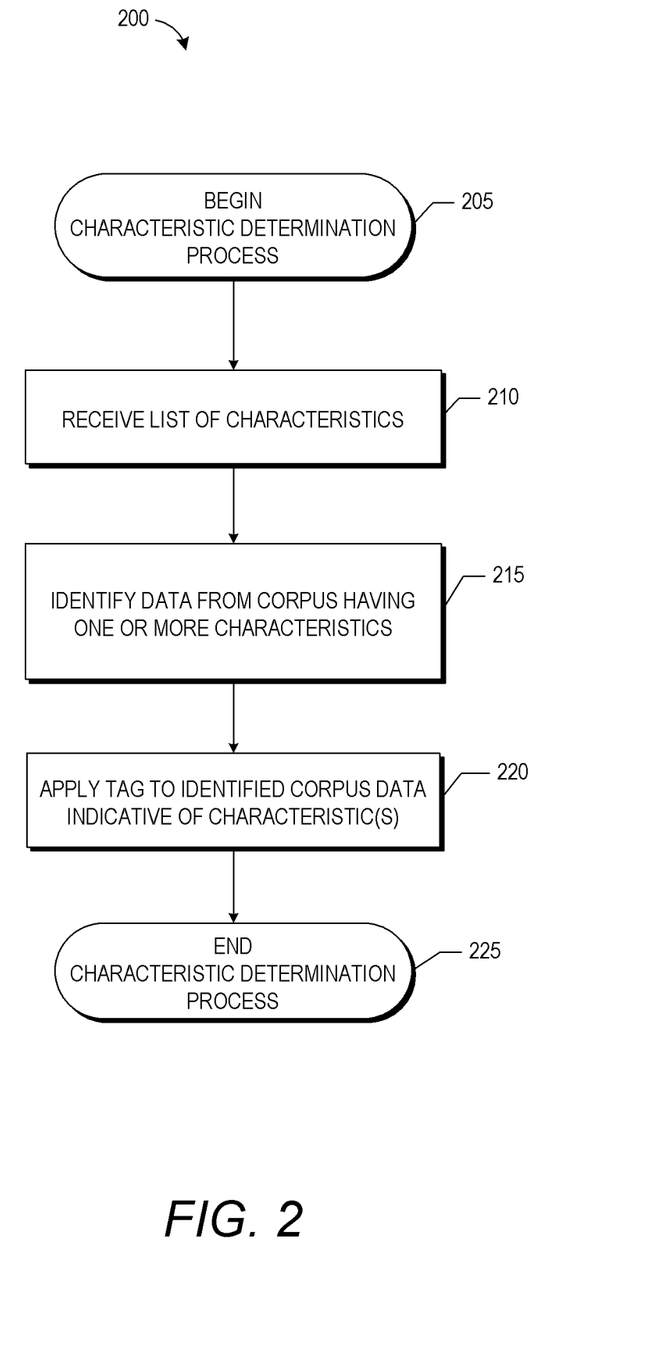
FIG. 2 is a flow diagram depicting an illustrative routine for determining characteristics of utterances in an existing corpus of data and applying tags to the corpus data indicative of the characteristics.

FIG. 2 is a flow diagram of an illustrative process 200 of identifying data within the corpus 105 having one or more characteristics and tagging the data within the corpus 105 with tags or labels indicative of the characteristics. In some implementations, the characteristic determination process 200 is configured to be executed by the characteristic determination module 110 of FIG. 1. The characteristic determination process 200 may advantageously pre-process the data in the corpus 105, thereby improving the efficiency and speed of acoustic model training by the acoustic model generator 120 because the characteristic determination has already been performed.

The characteristic determination process 200 starts at block 205. At block 210, the characteristic determination module 110 receives a list of characteristics. As described above, the characteristics may include any desired training information, such as, but not limited to, characteristics of utterances, characteristics of the speaker of the utterance, domain characteristics, and noise environment characteristics.

At block 215, the characteristic determination module 110 identifies data from the corpus 105 having one or more characteristics from the received list. The characteristics may be identified in many different ways. For identifying characteristics such as utterance type, text searching or natural language processing may be used. For example, conversational speech may be identified by searching for quotation marks in the textual transcription data and then tagging the corresponding audio data. Queries or questions may be identified by searching for question marks or common words used in questions (such as who, what, where, when, why, how, or is). Natural language processing techniques may also be used to identify keywords indicative of a particular characteristic. For example, if the characteristic determination module 110 is attempting to identify queries, natural language processing techniques may be used to identify the words who, what, where, when, why, how, or is. In some implementations, the corpus data includes metadata. In such implementations, the data having one or more characteristics can be identified based, at least in part, on the metadata.

In some instances, identifying data having particular characteristics may be performed by processing the audio data. For example, a signal processing module may be used to process audio data (such as waveforms) to determine pitch, intonation, age, gender, emotion, prosody, or other utterance characteristics. The signal processing module may be implemented in software and may include modules such as a pitch detector. In some implementations, a speech recognition module may be used to identify data having particular characteristics. In some implementations, identifying data having particular speaker characteristics may be based at least in part on metadata identifying the speaker of a data source or utterance, on natural language processing of the content of the textual transcription data (e.g., names, ages or other contextual indications of gender, age, accent, etc.), on information received or identified from a movie database accessible over a network in communication with the characteristic determination module 110, such as the Internet Movie Database (IMDb).

Once the appropriate data has been identified, the characteristic determination process 200 continues to block 220, where the characteristic determination module 110 applies a tag to the identified corpus data that is indicative of the one or more characteristics of the identified corpus data. In accordance with several embodiments, the pre-processing of the corpus data performed by the process 200 advantageously increases the speed and processing resources required to generate, train, update or otherwise configure specialized acoustic models.

The characteristic determination process 200 ends at block 225. The characteristic determination process 200 may be repeated multiple times as new lists of characteristics are received or new data is added to the corpus 105 over time.

Figure 3A:
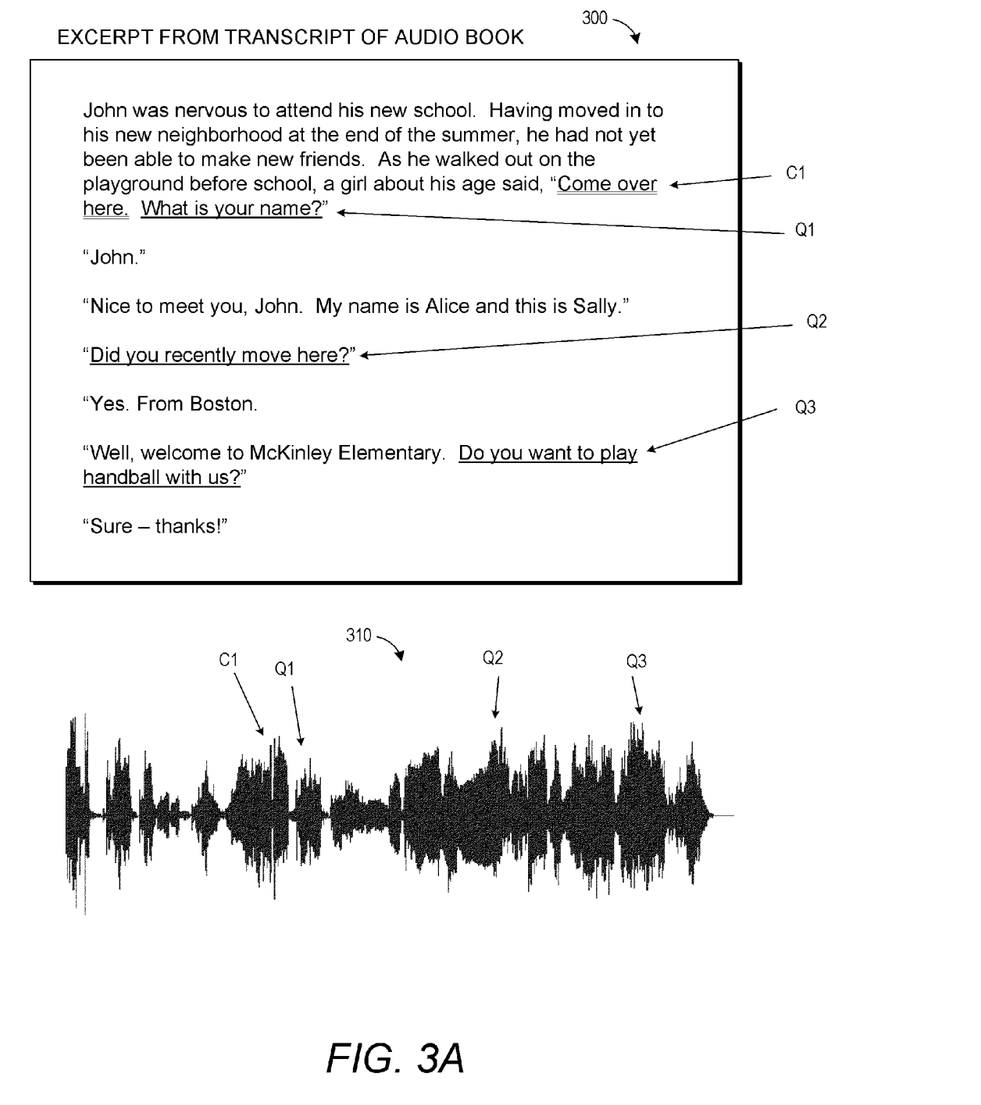
FIGS. 3A and 3B illustrate examples of corpus data including utterances identified as having particular utterance characteristics.
Figure 3B:
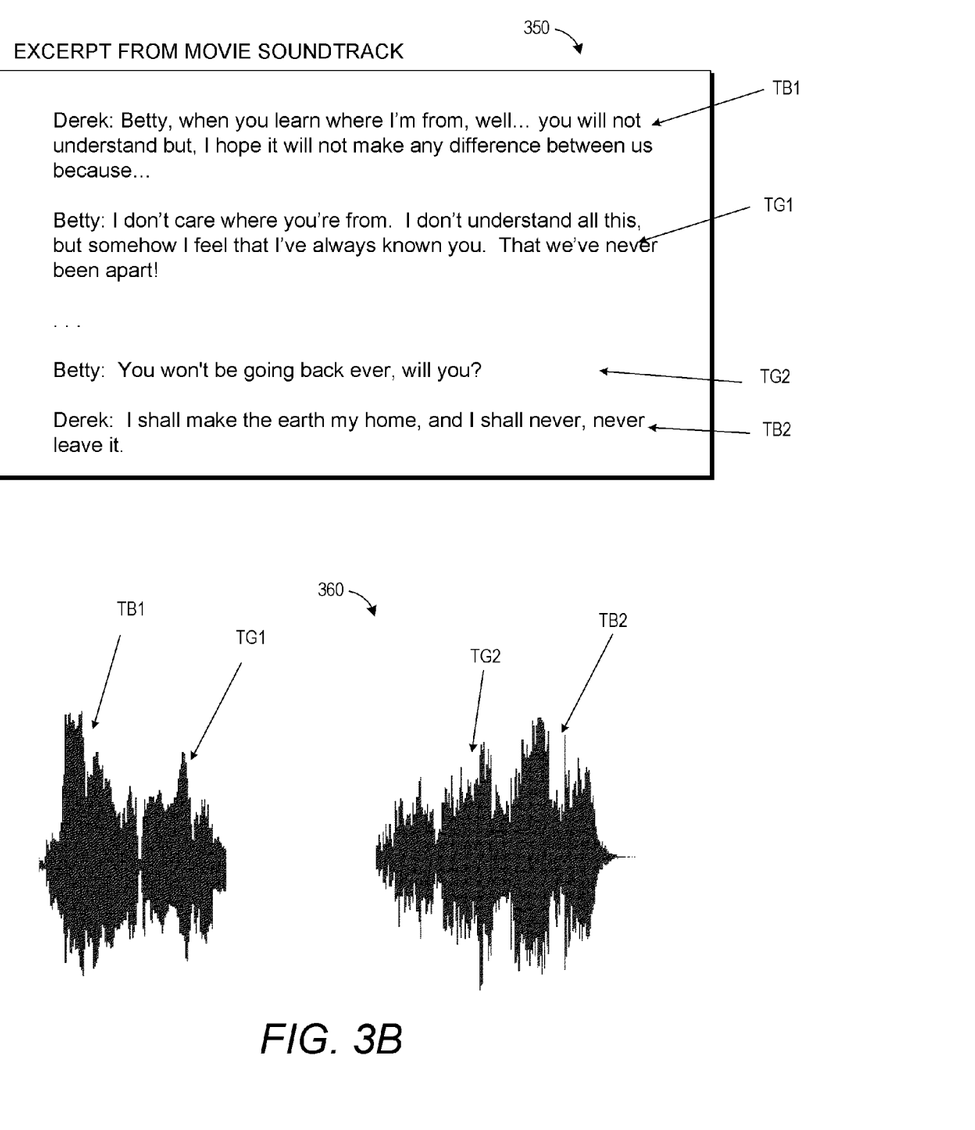

FIGS. 3A and 3B illustrate examples of corpus data including utterances identified as having particular utterance characteristics. FIG. 3A illustrates an example of text and corresponding audio data from an audio book within the corpus 105 and shows examples of portions of data identified by the characteristic determination module 110 or the utterance selection module 115 as commands and queries. FIG. 3A includes a representative excerpt 300 from a transcript of an audiobook from the corpus 105 and a corresponding excerpt 310 of the audio data (e.g., waveform) corresponding to the transcript excerpt 300.

As shown, the transcript excerpt 300 includes conversational speech with one command and multiple questions or queries being identified (by double-underline and single underline, respectively). As described above in connection with FIG. 1, one of the utterance characteristics may be utterance type (such as a query or command). As described above in connection with FIG. 2, the characteristic determination module 110 or the utterance selection module 115 may identify data within the corpus 105 as having a particular characteristic and tag the data with a tag or label indicative of the characteristic. The transcript excerpt 300 includes a phrase C1 identified as a command and three phrases Q1, Q2, Q3 identified as queries. The corresponding portions or segments of audio excerpt 310 may also be tagged or labeled as indicative of the utterance characteristic of being a command or query. In some implementations, data in the corpus 105 may be tagged as having multiple characteristics if such is the case.

FIG. 3B illustrates an example of text and corresponding audio data from a movie script/soundtrack combination within the corpus 105 and shows examples of portions of data that may be identified by the characteristic determination module 110 or the utterance selection module 115 as having particular gender and age category characteristics. FIG. 3B includes excerpts 350 from a transcript of a movie and corresponding excerpts 360 of the audio data corresponding to the transcript excerpts 350 that may be stored in the corpus 105. The data excerpts 350, 360 include portions of dialogue between a young teenage male alien (Derek) and a teenage girl from Earth (Betty). As described above in connection with FIG. 1, characteristics may include speaker characteristics, such as gender or age category characteristics. The characteristic determination module 110 or the utterance selection module 115 may identify the utterances TB1, TB2 spoken by the actor playing Derek as being examples of utterances having speaker characteristics of a male and/or a teenager and the utterances TG1, TG2 spoken by the actress playing Betty as being examples of utterances having speaker characteristics of a female and/or a teenager.

In some implementations, the identification of gender and/or age may be made based on natural language processing techniques (such as analysis of the content of the transcript data), based on metadata associated with the movie identifying the cast list and biographical information of cast members, based on information from a movie database accessible over a network in communication with the characteristic determination module 110 and/or the utterance selection module 115, such as the Internet Movie Database (IMDb), and/or based on acoustic signal processing techniques (e.g., pitch detection), as described above in connection with FIG. 2. The corresponding transcript and audio portions or segments of the transcript excerpt 350 and the audio excerpt 360 may be tagged or labeled as being representative of the characteristics.

Acoustic Model Training

Figure 4:
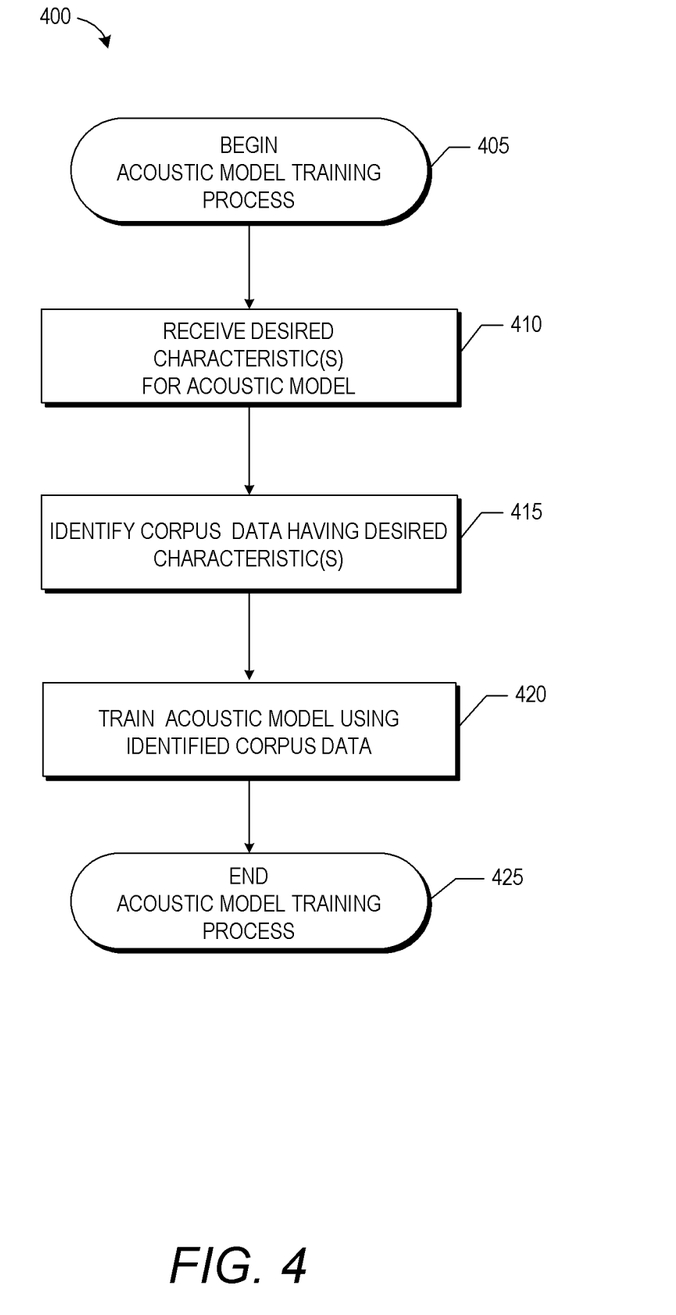
FIG. 4 is a flow diagram depicting an illustrative routine for training an acoustic model using training data having one or more characteristics.

FIG. 4 is a flow diagram depicting an illustrative process 400 of training an acoustic model with data having one or more training characteristics. The acoustic model training process 400 may advantageously be performed to generate specialized acoustic models or to update acoustic models based on one or more desired training characteristics.

The acoustic model training process 400 begins at block 405. In some implementations, the acoustic model training process 405 is performed by the utterance selection module 115 and the acoustic model generator 120 of FIG. 1. At block 410, the utterance selection module 115 receives one or more desired training characteristics to be used in identifying training data from the corpus 105 to use in creating or training an acoustic model. The desired training characteristics may be provided by a user via a user input device or by a feedback module in communication with the utterance selection module 115.

At block 415, the utterance selection module 115 identifies utterances or portions of utterances in the corpus data having the one or more desired training characteristics. In some implementations, the identification includes identifying the corpus data previously tagged as having the desired training characteristic by the characteristic determination module 110. In other implementations, the identification is performed "on the fly" or substantially in real time by the utterance selection module 115. In "on-the-fly" implementations, the utterance selection module 115 may identify the corpus data having the at least one desired training characteristic using the techniques, devices, and methods described above in connection with FIG. 2 and the characteristic determination module 110.

Once the data from the corpus 105 having the desired training characteristic is selected or identified, the process 400 proceeds to generate an acoustic model or update an existing acoustic model using the identified corpus data. An acoustic model may be generated by performing any training techniques known to one of skill in the art, including but not limited to maximum likelihood techniques, Baum-Welch estimation, Viterbi training, expectation maximization, maximum mutual information, or discriminative training. An acoustic model may be updated using maximum a posteriori adaptation or maximum likelihood linear regression techniques.

In some implementations, further filtering or adapting may be performed prior to generating the acoustic model based on additional input or factors, as desired or required. The additional input or factors may include additional training characteristics. For example, if all queries are identified, the further filtering or adapting may include identifying queries within a particular application or domain. The filtering or adapting may identify relevant portions or segments of utterances having a desired training characteristic and train an acoustic model using only the relevant portions of utterances instead of the entire utterance. For example, instead of all identified queries in the corpus being used to generate or adapt the acoustic model, only the relevant portions of the queries (e.g., triphones having a particular phonetic context) may be used. The process 400 ends at block 425.

In some implementations, the training information includes actual utterances of desired training phrases, words or subword units desired to be more accurately recognized by the acoustic model (such as words expected to be uttered by a user of the speech recognition system incorporating the acoustic model). In implementations where the desired training characteristics include a script of actual utterances desired to be trained, the utterance selection module 115 may search for the desired training utterances in the corpus 105.

In advantageous circumstances, there may be at least one instance (and potentially multiple instances) of the complete desired training utterance from one or more sources in the corpus 105. In some circumstances, however, the complete utterance does not exist in the corpus 105 from a single source. For example, if the desired training utterance is "I never received my package," a single source in the corpus 105 may not include that complete phrase as a whole. However, matching fragments or segments of the phrase may be identified from one or more sources in the corpus 105. For example, one source in the corpus 105 may include the phrase "I never received your phone call" and another source in the corpus 105 may include the phrase "I saw you open my package." The two phrases do not include the complete desired training phrase. However, each of the two phrases includes a matching fragment of the desired training phrase ("I never received" and "my package," respectively).

In accordance with several embodiments, the utterance selection module 115 or another component executing the acoustic model training process 400 may isolate and concatenate the two matching fragments from the two separate phrases together to create a synthesized piece of training data for the acoustic model. In some implementations, the process 400 identifies the minimum number of matching fragments needed to assemble the desired training utterance. The minimum number of fragments may be from the same source and/or speaker or from different sources and/or speakers. In some implementations, the process 400 may include intonation, pitch or other characteristics in determining which fragments to use in assembling the desired training utterance, in addition to minimizing the number of fragments. In other implementations, the pitch, intonation, prosody or other utterance characteristics may be adjusted after assembly of the matching fragments to improve quality. The assembled fragments, or synthesized training phrases, may be annotated with prosody and emotion characteristics for improved accuracy.

In accordance with some embodiments, multiple acoustic models are advantageously used for a particular acoustic context or application. For example, for some applications, it may be beneficial to have a specialized acoustic model for recognizing certain limited utterances intended to trigger actions and a generic acoustic model for recognizing other utterances that may be ignored. For example, a voice-activated remote control unit for a television may be in a speech recognition environment where there is likely to be a lot of utterances that are intended to be ignored and a list of limited key utterances that are intended to initiate an action by the remote control unit upon recognition. A voice-activated phone application may also benefit from a combination of one or more specialized acoustic models and one or more generic acoustic models.

The specialized acoustic model may comprise a complex, sophisticated model that includes a large amount of specialized and focused training data from a wide variety of speakers and sources. For example, the specialized acoustic model may be created by the acoustic model training process 400 described above. The generic acoustic model may be a less sophisticated acoustic model generated based on limited training data. The specialized acoustic model and the generic acoustic model may be packaged together and used in combination to perform speech recognition.

Execution Environment

Figure 5:
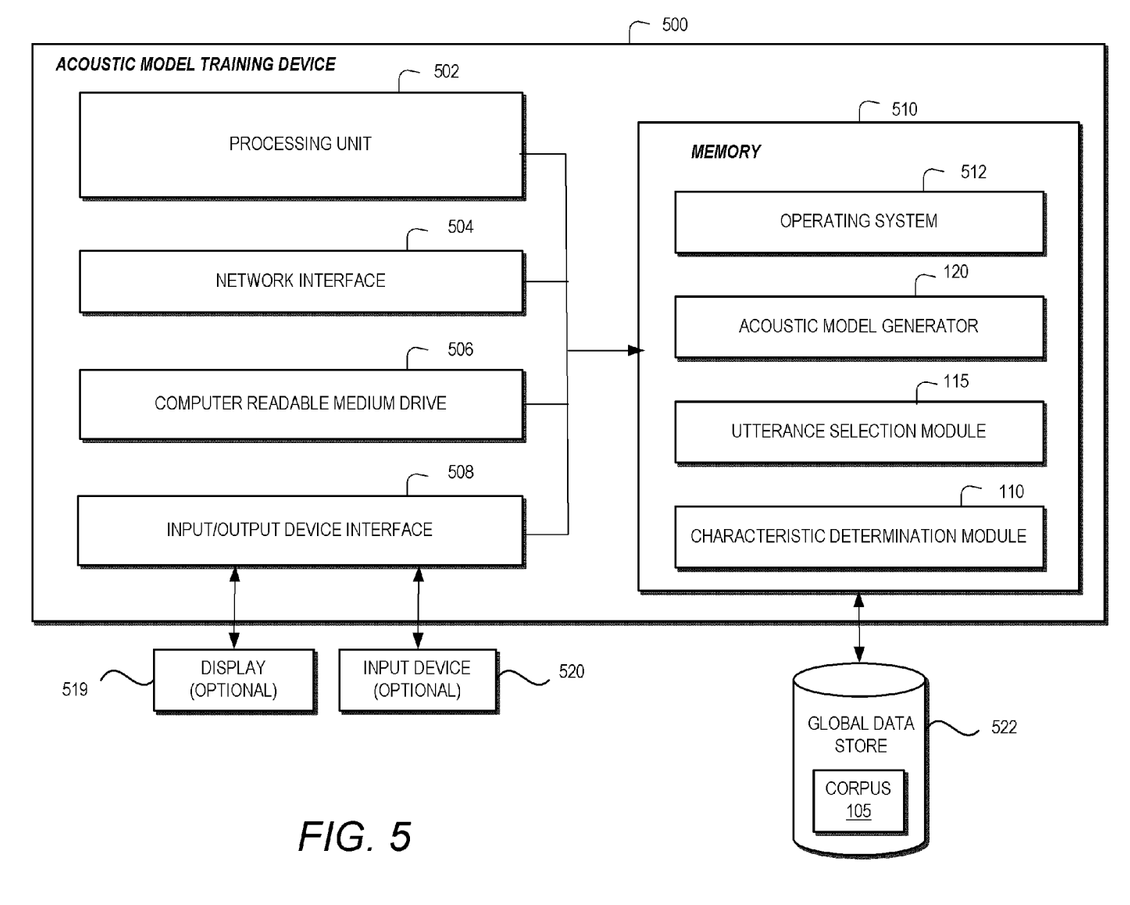
FIG. 5 is a block diagram of an embodiment of a system environment in which acoustic models may be trained.

FIG. 5 illustrates one embodiment of an acoustic model training device 500 configured to execute the processes and implement the features described above. The acoustic model training device 500 can comprise one or more servers or other computing devices, and can comprise a processing unit 502, a network interface 504, a computer readable medium drive 506, an input/output device interface 508, and a memory 510. The network interface 504 can provide connectivity to one or more networks or computing systems. The processing unit 504 can receive information and instructions from other computing systems or services via the network interface 504. The network interface 504 can also store data directly to memory 510. The processing unit 502 can communicate to and from memory 510 and output information to an optional display 519 via the input/output device interface 508. The input/output device interface 508 can also accept input from the optional user input device 520, such as a keyboard, mouse, digital pen, microphone, etc. In some embodiments, the user input device 520 is communicatively coupled to the computing device 500 over a network. The user input devices 520 may also include or communicate with one or more auxiliary data stores.

The memory 510 contains computer program instructions that the processing unit 502 executes in order to implement one or more embodiments. The memory 510 generally includes RAM, ROM and/or other persistent, non-transitory computer-readable media. The memory 510 can store an operating system 512 that provides computer program instructions for use by the processing unit 502 in the general administration and operation of the computing device 500. The memory 510 can further include computer program instructions and other information for implementing aspects of the present disclosure. For example, in one embodiment, the memory 510 includes the characteristic determination module 110, the utterance selection module 115 and the acoustic model generator 120, which can be executed by the processing unit 502. Memory 510 may also include or communicate with one or more auxiliary data stores, such as global data store 522. Global data store 522 may electronically store data (such as corpus 105). The global data store 522 may comprise multiple data storage devices, each of which is communicatively coupled to the memory 510 (e.g., over a network). In some implementations, data may be stored, at least temporarily, in the memory 510.

In some embodiments, the computing device 500 may include additional or fewer components than are shown in FIG. 5. For example, a computing device 500 may include more than one processing unit 502 and computer readable medium drive 506. In another example, the computing device 502 may not include be coupled to a display 519 or a user input device 520. In some embodiments, two or more computing devices 500 may together form a computer system for executing features of the present disclosure. For example, the computing device 500 may comprise multiple distributed computing resources connected over a network. In some implementations, the computing device 500 comprises one or more servers of a distributed or hosted computing environment. A distributed or hosted computing environment may also be referred to as a cloud computing environment.

Terminology

Depending on the embodiment, certain acts, events, or functions of any of the processes or algorithms described herein can be performed in a different sequence, can be added, merged, or left out all together (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The steps of a method, process, routine, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. An acoustic modeling system, comprising:
   under control of one or more computing devices configured with specific computer-executable instructions,
   receiving a plurality of characteristics of utterances to be used to create an acoustic model;
   for each characteristic in the plurality of characteristics:
      identifying an utterance within a corpus of utterances having the characteristic; and
      associating at least a portion of the utterance with a tag indicative of the characteristic;
   receiving an identification of a desired training utterance, wherein the desired training utterance comprises a first portion associated with a first desired characteristic and a second portion associated with a second desired characteristic, and wherein the desired training utterance is not included in the corpus;
   selecting, from the corpus, a first utterance,
      wherein a portion of the first utterance comprises at least the first portion of the desired training utterance, and
      wherein the portion of the first utterance is associated with a tag corresponding to the first desired characteristic;
   extracting the portion of the first utterance from the first utterance;
   selecting, from the corpus, a second utterance,
      wherein a portion of the second utterance comprises at least the second portion of the desired training utterance, and
      wherein the portion of the second utterance is associated with a tag corresponding to the second desired characteristic;
   extracting the portion of the second utterance from the second utterance;
   concatenating the portion of the first utterance with the portion of the second utterance to generate the desired training utterance; and
   training an acoustic model, wherein:
      the acoustic model comprises statistical representations of possible sounds of subword units; and
      the statistical representations are generated based on a comparison between audio data associated with the desired training utterance that is generated and a textual transcription of the desired training utterance that is generated.

2. The system of claim 1, wherein the plurality of characteristics comprises at least one of: phrase type characteristics, speaker characteristics, accent characteristics, pitch characteristics, intonation characteristics, emotion characteristics, subword unit characteristics, or background noise level characteristics.

3. The system of claim 1, wherein the computing device is configured to select the first utterance from the corpus using natural language processing.

4. The system of claim 1, wherein a desired characteristic is an indication of a word or subword unit.

5. The system of claim 1, wherein the corpus comprises data from at least one of audiobooks, movie soundtracks, customer service calls, or speeches.

6. A computer-implemented method, comprising:
  under control of one or more computing devices configured with specific computer-executable instructions,
    receiving an identification of a desired training utterance having a first portion and a second portion, wherein the desired training utterance is not included in a corpus;
    selecting, from the corpus, a first utterance comprising at least a first portion of the desired training utterance;
    extracting, from the first utterance, a portion of the first utterance comprising the first portion of the desired training utterance, wherein the first portion of the desired training utterance and at least the portion of the first utterance are associated with a first desired characteristic;
    selecting, from the corpus, a second utterance comprising at least a second portion of the desired training utterance;
    extracting, from the second utterance, a portion of the second utterance comprising the second portion of the desired training utterance, wherein the second portion of the desired training utterance and at least the portion of the second utterance are associated with a second desired characteristic;
    concatenating at least the portion of the first utterance and the portion of the second utterance to generate the desired training utterance; and
    training an acoustic model using the desired training utterance that is generated.

7. The computer-implemented method of claim 6, wherein the first desired characteristic is at least one of a phrase type characteristic, an accent characteristic, a pitch characteristic, an intonation characteristic, an emotion characteristic, a subword unit characteristic, or a background noise level characteristic.

8. The computer-implemented method of claim 6, wherein the corpus comprises data from one or more of audiobooks, movie soundtracks, customer service calls, or speeches.

9. The computer-implemented method of claim 6, wherein training the acoustic model using the desired training utterance that is generated comprises creating a new acoustic model or adapting an existing acoustic model.

10. The computer-implemented method of claim 6, wherein the corpus was previously tagged with the first desired characteristic and the second desired characteristic.

11. The computer-implemented method of claim 6, wherein selecting the first utterance comprising the first portion corresponding to the first desired characteristic from the corpus comprises identifying data from the corpus having the first desired characteristic by analyzing the corpus data.

12. The computer-implemented method of claim 6, wherein the first desired characteristic comprises an utterance or portion of an utterance identified as having a low confidence value based on speech recognition results.

13. The computer-implemented method of claim 6, wherein the first desired characteristic is one of a question utterance or a command utterance.

14. The computer-implemented method of claim 6, wherein the first desired characteristic is one of a gender, an age category, or an accent.

15. The computer-implemented method of claim 6, wherein training an acoustic model using the desired training utterance that is generated comprises at least one of generating, creating, configuring, updating, or adapting the acoustic model using the desired training utterance that is generated.

16. The computer-implemented method of claim 6, wherein:
  the desired training utterance that is generated comprises audio data and transcription data corresponding to the audio data of the desired training utterance that is generated; and
  concatenating at least the first portion of the first utterance and the portion of the second utterance to generate the desired training utterance comprises:
    creating the audio data of the desired training utterance that is generated from audio data of the first portion of the first utterance and audio data of the portion of the second utterance; and
    creating the transcription data of the desired training utterance that is generated from transcription data of the portion of the first utterance and transcription data of the portion of the second utterance.

17. The computer-implemented method of claim 16, wherein training the acoustic model using the desired training utterance that is generated comprises generating statistical representations of sounds of subword units associated with the desired training utterance that is generated based on a comparison of the audio data of the desired training utterance that is generated with the transcription data of the desired training utterance that is generated.

18. A system comprising:
  an electronic data store configured to store a corpus of audio data and corresponding transcription data; and
  at least one computing device in communication with the electronic data store and configured to:
    receive an identification of a desired training utterance having a first portion and a second portion, wherein the desired training utterance is not included in the corpus;
    select, from the corpus, a first utterance comprising at least a first portion of the desired training utterance;
    extract, from the first utterance, a portion of the first utterance comprising the first portion of the desired training utterance, wherein the first portion of the desired training utterance and at least the portion of the first utterance are associated with a first desired characteristic;
    select, from the corpus, a second utterance comprising a second portion of the desired training utterance;
    extract, from the second utterance, a portion of the second utterance comprising the second portion of the desired training utterance, wherein the second portion of the desired training utterance and at least the portion of the second utterance are associated with a second desired characteristic;
    concatenating at least the portion of the first utterance and the portion of the second utterance to generate the desired training utterance; and training an acoustic model using the desired training utterance that is generated.

19. The system of claim 18, wherein the first desired characteristic comprises a question or command utterance.

20. The system of claim 18, wherein the first desired characteristic comprises a gender of the speaker or an age of the speaker.

21. The system of claim 18, wherein the first desired characteristic is that the utterance comprises a particular subword unit.

22. A non-transitory computer-readable medium comprising one or more computer-executable modules, the one or more computer-executable modules configured to:
receive an identification of a desired training utterance having a first portion and a second portion, wherein the desired training utterance is not included in a corpus;
select, from the corpus, a first utterance comprising at least a first portion of the desired training utterance;
extract, from the first utterance, a portion of the first utterance comprising the first portion of the desired training utterance, wherein the first portion of the desired training utterance and at least the portion of the first utterance are associated with a first desired characteristic;
select, from the corpus, a second utterance comprising at least a second portion of the desired training utterance;
extract, from the second utterance, a portion of the second utterance comprising the second portion of the desired training utterance, wherein the second portion of the desired training utterance and at least the portion of the second utterance are associated with a second desired characteristic;
concatenating at least the portion of the first utterance the portion of the second utterance to generate the desired training utterance; and
train an acoustic model using the desired training utterance that is generated.

23. The non-transitory computer-readable medium of claim 22, wherein the first desired characteristic is at least one of: a phrase type, an accent characteristic, a pitch characteristic, an intonation characteristic, an emotion characteristic, a phonetic context characteristic, or a background noise level characteristic.

24. The non-transitory computer-readable medium of claim 22, wherein the first desired characteristic comprises an identification of a query utterance.

25. The non-transitory computer-readable medium of claim 22, wherein the first desired characteristic is a gender of the speaker or an age category of the speaker.

26. The non-transitory computer-readable medium of claim 22, wherein the corpus comprises utterances from at least one of audiobooks, movie soundtracks, customer service calls or speeches.

* * * * *

UNITED STATES PATENT AND TRADEMARK OFFICE
CERTIFICATE OF CORRECTION

PATENT NO. : 9,495,955 B1  
APPLICATION NO. : 13/733084  
DATED : November 15, 2016  
INVENTOR(S) : Frederick V. Weber Page 1 of 1

It is certified that error appears in the above-identified patent and that said Letters Patent is hereby corrected as shown below:

In the Claims

In Column 14 at Line 21, In Claim 16, before "portion" delete "first".

In Column 14 at Line 25, In Claim 16, before "portion" delete "first".

In Column 16 at Line 5, In Claim 22, after "utterance" insert --and--.

Signed and Sealed this  
Thirteenth Day of February, 2018

Andrei Iancu  
*Director of the United States Patent and Trademark Office*